(12) United States Patent
Kato et al.

(10) Patent No.: US 6,926,980 B2
(45) Date of Patent: Aug. 9, 2005

(54) SYSTEM AND METHOD FOR DRAINING REMAINING WATER IN FUEL CELL

(75) Inventors: Hideo Kato, Utsunomiya (JP); Katsumi Hayashi, Utsunomiya (JP); Minoru Uoshima, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 397 days.

(21) Appl. No.: 10/112,817

(22) Filed: Mar. 29, 2002

(65) Prior Publication Data

US 2002/0142197 A1 Oct. 3, 2002

(30) Foreign Application Priority Data

Apr. 3, 2001 (JP) ...................................... P2001-105078

(51) Int. Cl.$^7$ ............................................... H01M 8/04
(52) U.S. Cl. ........................................... 429/13; 429/25
(58) Field of Search .............................. 429/13, 22, 25

(56) References Cited

U.S. PATENT DOCUMENTS 5,798,186 A    8/1998    Fletcher et al.
6,475,655 B1 * 11/2002  Nakanishi et al. ............. 429/19
6,479,177 B1 * 11/2002  Roberts et al. ................. 429/13

FOREIGN PATENT DOCUMENTS

WO    WO 97/48142    12/1997

* cited by examiner

*Primary Examiner*—Susy Tsang-Foster
(74) *Attorney, Agent, or Firm*—Lahive & Cockfield, LLP; Anthony A. Laurentano, Esq.

(57) ABSTRACT

A system and method for draining remaining water in a gas passage of a fuel cell, which has a simple structure and the remaining can be efficiently and reliably drained outside. Water which remains in a gas passage of the fuel cell is first drained by increasing the flow rate of the reaction gas while the operation of the fuel cell is stopped. The remaining water which has not been drained is then drained by increasing the pressure of the reaction gas and then decreasing the increased pressure. The increase and decrease operation of the pressure of the reaction gas is started after the increase of the flow rate of the reaction gas is started. Typically, the increase of the pressure of the reaction gas is started when a predetermined time has elapsed after the increase of the flow rate of the reaction gas is started.

2 Claims, 5 Drawing Sheets

SYSTEM AND METHOD FOR DRAINING REMAINING WATER IN FUEL CELL

BACKGROUND OF THE INVENTION

1. Field of the Invention

The present invention relates to a system and method for draining remaining water in a fuel cell, and in particular, relates to an art for draining remaining water outside, which remains in reaction-gas passages of a fuel cell.

2. Description of the Related Art

In conventional solid polymer electrolyte membrane fuel cells, each cell has an anode and a cathode which are provided on either side of a solid polymer electrolyte membrane. Plural such cells are stacked so as to form a stack, which is called a "fuel cell" in the following explanations. In the fuel cell, hydrogen, which functions as fuel, is supplied to the anode, while air, which functions as an oxidizing gas, is supplied to the cathode. The catalytic reaction on the anode generates hydrogen ions, and the hydrogen ions are transferred to the cathode via an electrolyte membrane. The transferred hydrogen ions react with oxygen on the cathode, thereby generating electric power.

In order to maintain the ion conductivity of the solid polymer electrolyte membrane, water is mixed with each reaction gas (i.e., hydrogen or air) which is supplied to the fuel cell, by using a humidifier or the like. In addition, when the fuel cell works, water is produced due to an electrochemical reaction. If such water condenses in a reaction gas passage (through which each reaction gas passes), the condensed water may remain in the reaction gas passage, so that the passage may be blocked.

If the fuel cell operation is stopped and the temperature of the fuel cell falls below the freezing point while the reaction gas passage is blocked by the condensed water, then the condensed water freezes which blocks the gas passage. Therefore, it is difficult to restart the fuel cell.

In order to solve such a problem, Published Japanese Translation No. 2000-512068, of PCT International Publication No. WO97/48142, discloses a fuel cell power generating system in which the inside of the reaction gas passage is purged while the fuel cell is stopped, so that the remaining water in the reaction gas passage is drained outside. This system employs a dedicated gas supply passage for purging, where a dried purification gas passes through the gas supply passage. Accordingly, the remaining water in the reaction gas passage is drained outside.

However, if a dedicated gas supply line is provided as in the above conventional fuel cell power generating system, the system structure is complicated. In addition, passing of the dried purification gas produces an excessively dried state inside the fuel cell, so that the solid polymer electrolyte membrane may be damaged.

SUMMARY OF THE INVENTION

In consideration of the above circumstances, an object of the present invention is to provide a system and method for draining remaining water in a fuel cell, wherein the system has a simple structure and the remaining water in the reaction gas passage can be efficiently and reliably drained outside.

Therefore, the present invention provides a system for draining remaining water in a fuel cell, comprising:

a gas supply section (e.g., an air supply section 12 and a fuel supply section 14 in an embodiment explained below) for supplying a reaction gas through a gas passage to the fuel cell;

a gas flow-rate control section (e.g., a control section 10a in the embodiment explained below) for draining remaining water, which remains in the gas passage of the fuel cell, by increasing the flow rate of the reaction gas while the operation of the fuel cell is stopped; and a gas pressure control section (e.g., a control section 10a and a fuel supply side pressure control section 15 in the embodiment explained below) for draining remaining water, which has not been drained by the gas flow-rate control section, by increasing the pressure of the reaction gas and then decreasing the increased pressure, where the increase and decrease operation of the pressure of the reaction gas is started after the increase of the flow rate of the reaction gas is started by the gas flow-rate control section.

In the above structure, after the operation of the fuel cell is stopped, the flow rate of the gas is first increased by the gas flow-rate control section. Accordingly, the remaining water in the gas passage is quantitatively drained outside the fuel cell.

In the next step, the pressure of the gas is increased by the gas pressure control section, and then the increased pressure is released (i.e., decreased) also by the gas pressure control section, so that the flow velocity of the reaction gas in the gas passage is increased. Accordingly, the remaining water, which cannot be drained outside merely by increasing the flow rate of the reaction gas, is drained outside. Typically, water which cannot be easily removed remains in a bent portion of the reaction gas passage, or the like.

As explained above, the draining of the remaining water is performed by two steps, according to the amount of the target remaining water or the area where the water remains. Therefore, the remaining water in the gas passage of the fuel cell can be reliably drained.

In addition, the draining of the remaining water is performed while the operation of the fuel cell is stopped. Therefore, when the operation of the fuel cell is restarted, no water remains in the gas passage, and it is possible to prevent the gas passage from being blocked due to the freezing of the remaining water.

As a typical example, the increase of the pressure of the reaction gas is started by the gas pressure control section when a predetermined time (e.g., time t1 in the embodiment explained below) has elapsed after the increase of the flow rate of the reaction gas is started by the gas flow-rate control section.

In this case, the flow rate of the gas in the gas passage is increased for a predetermined time, so that the flow velocity of the reaction gas is increased and a large part of the remaining water in the gas passage is quantitatively drained outside.

After this process, the pressure of the gas is increased by the gas pressure control section, and then the increased pressure is released (i.e., decreased) also by the gas pressure control section, so that the remaining water, which cannot be drained outside merely by increasing the flow rate of the reaction gas, can be drained outside.

The present invention also provides a method of draining remaining water in a gas passage of a fuel cell while the operation of the fuel cell is stopped, the method comprising the steps of:

supplying a reaction gas to the gas passage of the fuel cell which is stopped;

increasing the pressure of the supplied reaction gas; and decreasing the increased pressure of the reaction gas.

According to the above method, after the pressure of the gas in the gas passage is increased, the increased gas is released when, for example, the gas pressure exceeds a predetermined pressure. Therefore, the flow velocity of the reaction gas in each gas passage can be suddenly increased. According to the conditions of the present invention for forcibly and easily draining the remaining water, the remaining water can be reliably drained outside the fuel cell.

DESCRIPTION OF THE PREFERRED EMBODIMENTS

Figure 1:
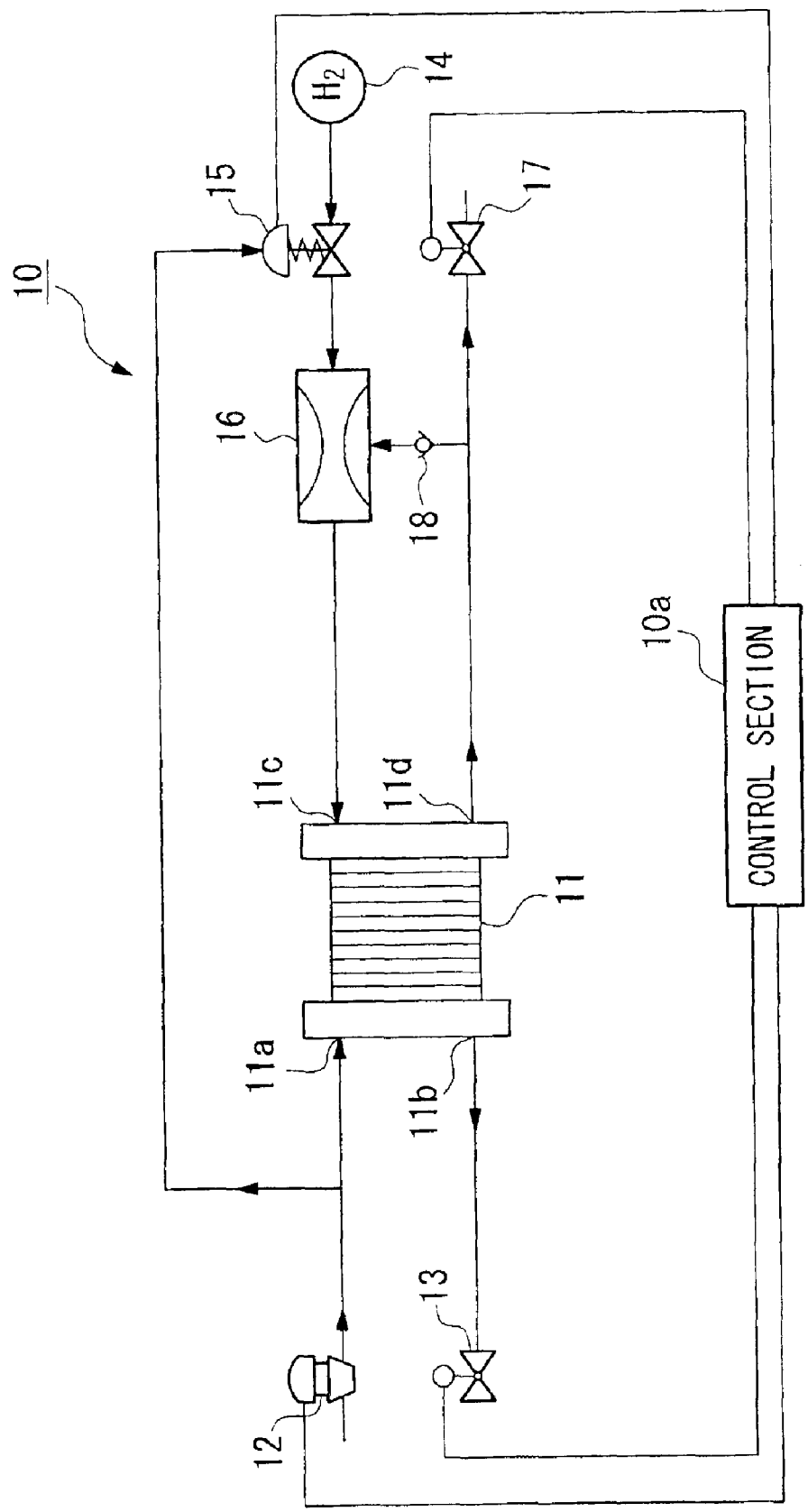
FIG. 1 is a diagram showing the structure of the remaining water draining system for a fuel cell as an embodiment according to the present invention.

Hereinafter, the structure of the system for draining remaining water in a fuel cell as an embodiment of the present invention will be explained with reference to the drawings. FIG. 1 is a diagram showing the structure of the system (10).

That is, the remaining water draining system 10 according to the present embodiment is built, for example, in a vehicle such as an electric car. The system comprises a control section 10a, a fuel cell 11, an air supply section 12, a back pressure valve 13, a fuel supply section 14, a fuel supply side pressure control section 15, an ejector 16, and a discharge valve 17. The control section 10a controls the operation of each section which connected to the control section 10a.

In the fuel cell 11, each unit cell has an anode and a cathode which are provided on either side of a solid polymer electrolyte membrane which may be a solid polymer ionic exchange membrane. A plurality of the unit cells are stacked so as to form a stack. The fuel cell 11 has a fuel electrode to which hydrogen (which functions as fuel) is supplied and an air electrode to which air is supplied, the air including oxygen and functioning as an oxidizing gas.

In the air electrode of the fuel cell 11, an air inlet 11a and an air outlet 11b are provided. Air is supplied through the air inlet 11a from the oxidizing gas supply section 12, and the air outlet 11b is provided for discharging the air and the like in the air electrode to the outside. In the fuel electrode, a fuel inlet 11c for supplying hydrogen and a fuel outlet 11d for discharging the hydrogen and the like in the fuel electrode are provided.

The oxidizing gas supply section 12 may employ an air compressor and is controlled based on the load of the fuel cell 11, an input signal from an accelerator pedal (not shown), and the like. The oxidizing gas supply section 12 supplies air to the air electrode of the fuel cell 11, and also supplies air as a signal pressure used in the fuel supply side pressure control section 15.

The hydrogen as the fuel is supplied from the fuel inlet 11c to the fuel electrode of the fuel cell 11 via the fuel supply section 14, the fuel supply side pressure control section 15, and the ejector 16 in turn.

In addition, discharged fuel, which has not been used for reaction and is discharged from the fuel outlet 11d of the fuel cell 11, is supplied via a check valve 18 to the ejector 16. The fuel supplied from the fuel supply side pressure control section 15 is merged with the fuel discharged from the fuel cell 11, and the merged fluid is supplied to the fuel cell 11.

The fuel supply side pressure control section 15 may employ a pneumatic proportional pressure control valve and uses the pressure of the air supplied from the oxidizing gas supply section 12 as a signal pressure for setting the "supply" pressure of the fuel at the outlet of the pressure control section 15 (i.e., the fuel which has passed through the fuel supply side pressure control section 15), so as to obtain a predetermined differential pressure between the supply pressure of the fuel and the supply pressure of the oxidizing gas. This differential pressure corresponds to a differential pressure between the fuel electrode and the air electrode.

That is, the pressure of the air which functions as the oxidizing gas is used as a reference pressure, and the fuel supply side pressure control section 15 for controlling the pressure of the hydrogen (which functions as fuel) controls the differential pressure between the oxidizing gas pressure and the fuel pressure with respect to the solid polymer electrolyte membrane of the fuel cell 11 (i.e., the differential pressure between the fuel electrode and the air electrode) to be within a predetermined range.

Accordingly, as explained below, when the pressure of the oxidizing gas at the air electrode is increased, the fuel pressure at the fuel electrode is also increased with respect to the pressure of the oxidizing gas (i.e., reference pressure) by using the control section 10a and the fuel supply side pressure control section 15. Therefore, the differential pressure between the air and fuel electrodes with respect to the solid polymer electrolyte membrane can be set within a predetermined range. Accordingly, it is possible to prevent the differential pressure between the electrodes from excessively increasing, so that an excessive differential pressure is not applied to the solid polymer electrolyte membrane. Therefore, the solid polymer electrolyte membrane is not damaged and can be protected.

The fuel supply side pressure control section 15 is not limited to a proportional pressure control valve as in the present embodiment, and may be another type of the pressure control valve. In this case, preferably, when the pressure of the oxidizing gas at the air electrode is increased, the fuel pressure at the fuel electrode is almost simultaneously increased. Accordingly, the differential pressure between the electrodes, applied to the solid polymer electrolyte membrane, can be set within a predetermined range.

The discharged fuel from the fuel cell 11 is drawn into the ejector 16 (i.e., the second fuel stream drawn into the ejector) by negative pressure produced in the vicinity of the high-speed fuel stream (i.e., main stream) which passes through the ejector. The discharged fuel in the second stream is merged with the fuel in the high-speed stream, so that the discharged fuel is supplied to the fuel cell 11 again, thereby circulating the discharged fuel from the fuel cell 11.

The remaining water draining system 10 for the fuel cell has the above-explained structure. Below, the operation of the remaining water draining system 10, in particular, the operation while the fuel cell 11 is stopped, will be explained with reference to the drawings.

Figure 2:
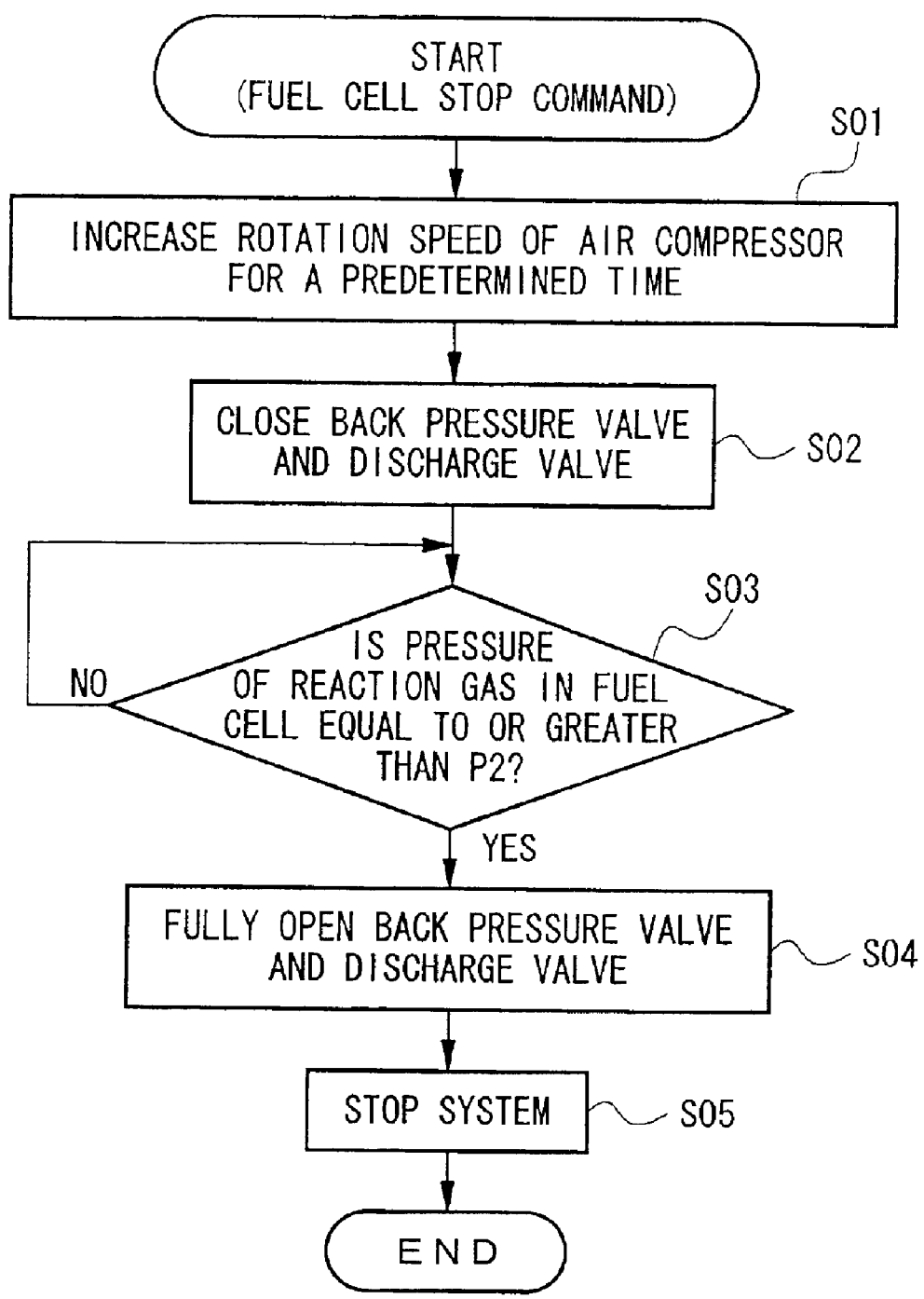
FIG. 2 is a flowchart showing the operation of the remaining water draining system in FIG. 1.
Figure 3:
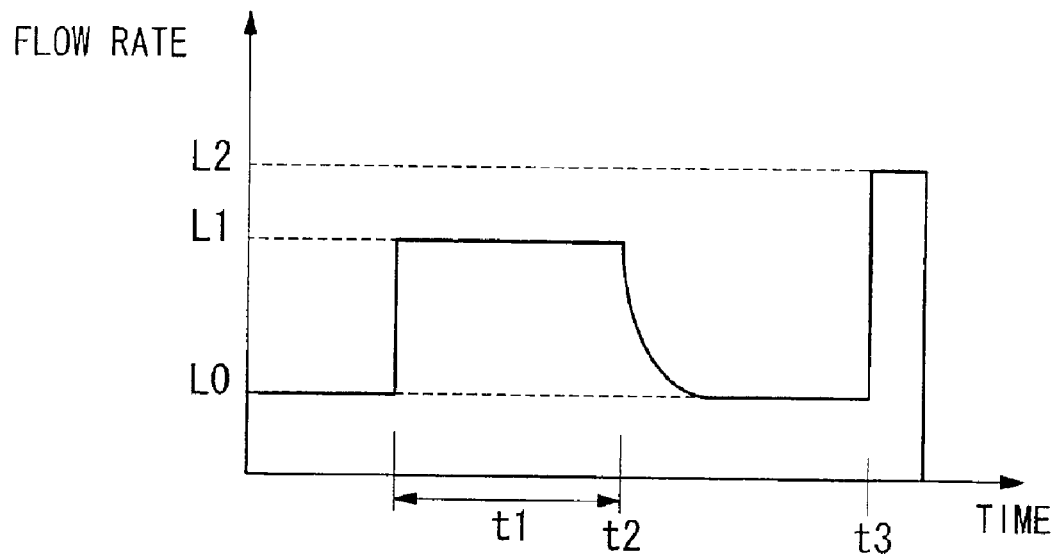
FIG. 3 is a graph showing changes in the flow rate of each reaction gas inside the fuel cell (i.e., hydrogen at the fuel electrode or air at the air electrode).
Figure 4:
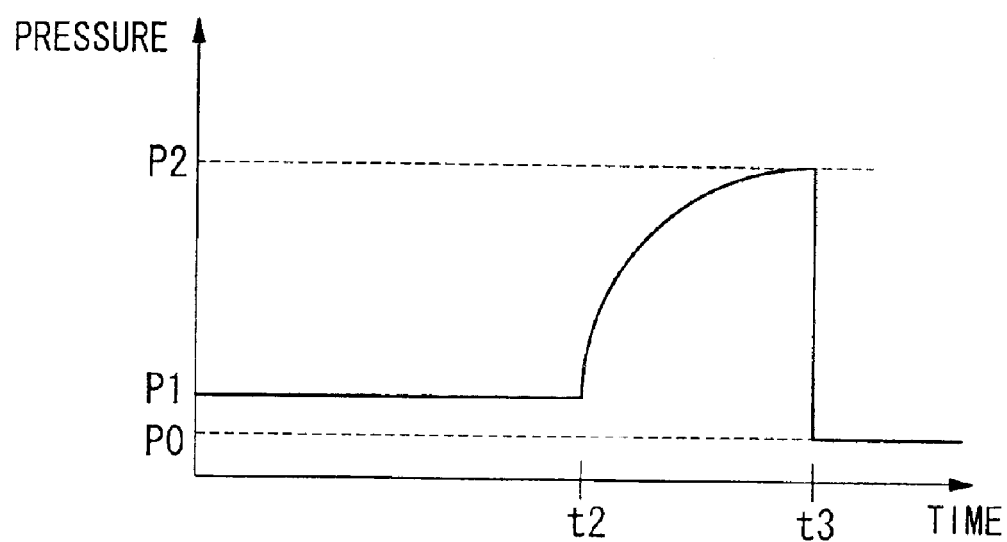
FIG. 4 is a graph showing changes in the pressure of the reaction gas inside the fuel cell.

FIG. 2 is a flowchart showing the operation of the remaining water draining system 10. This operation is basically controlled by the control section 10a. FIG. 3 is a graph showing changes in the flow rate of each reaction gas (i.e., hydrogen at the fuel electrode or air at the air electrode). FIG. 4 is a graph showing changes in the pressure of the reaction gas inside the fuel cell 11.

In the first step S01 in FIG. 2, when the control section 10a receives a command signal for stopping the operation of the fuel cell 11, the control section 10a increases the rotation speed of the air compressor included in the oxidizing gas supply section 12 for a predetermined time t1. Accordingly, as shown in FIG. 3, the flow rate of each reaction gas which circulates in the fuel cell 11 increases from L0 to L1, where L0 is a specific flow rate assigned to the steady operation of the system 10 and L1 is a first predetermined flow rate. After the predetermined time t1 has passed, the flow rate gradually decreases and typically returns to L0 (for the steady operation).

In the next step S02, the back pressure valve 13 and the discharge valve 17 are closed. Here, instead of closing these valves, the degree of opening of each valve may be decreased. Accordingly, since time t2 when the back pressure valve 13 and the discharge valve 17 are closed, the pressure of each reaction gas which circulate in the fuel cell 11 gradually increases from a specific pressure P1 assigned to the steady operation.

In the following step S03, it is determined whether the pressure of the reaction gas which circulates in the fuel cell 11 reaches a first predetermined pressure P2 (e.g., 200 kPa). If the result of the determination is "NO", step S03 is repeated, while if the result of the determination is "YES", the operation proceeds to step S04.

In step S04, the back pressure valve 13 and the discharge valve 17 are fully opened. Accordingly, as shown in FIG. 3, the flow rate of the reaction gas which circulate in the fuel cell 11 sharply increases to L2 at time t3 when the back pressure valve 13 and the discharge valve 17 are fully opened, and the flow rate L2 is maintained for a suitable time. Here, L2 is a second predetermined flow rate (here, L2>L1). After t3 when the back pressure valve 13 and the discharge valve 17 are fully opened, the pressure of the reaction gas which circulates inside the fuel cell 11 decreases to the atmospheric pressure P0, and the pressure P0 is maintained (see FIG. 4).

In step S05, the operation of the remaining water draining system 10 is stopped, typically by stopping supply of each reaction gas, so that the process for stopping the system is completed.

That is, in the first step, the flow rate of each reaction gas is increased by increasing the amount of gas in the relevant gas passage of the fuel cell 11, so that a large part of the remaining water in the gas passage is drained outside.

In the second step, the pressure of gas in the gas passage is increased and then abruptly decreased, so that the flow rate of the reaction gas suddenly increases. As a result, the remaining water, which cannot be drained outside merely by increasing the flow rate of the reaction gases (i.e., in the first step), is drained outside.

As explained above, according to the remaining water draining system 10 of the present embodiment, the draining of the remaining water is performed by two steps, according to the amount of the target remaining water or the area where the water remains. The first step is a quantitative draining operation by increasing the flow rate of the reaction gas, and the following second step is a qualitative draining operation by increasing and then decreasing the gas pressure. Therefore, the structure of the remaining water draining system 10 for a fuel cell can be simple, and the remaining water in the gas passage of the fuel cell can be efficiently and reliably drained.

Figure 5:
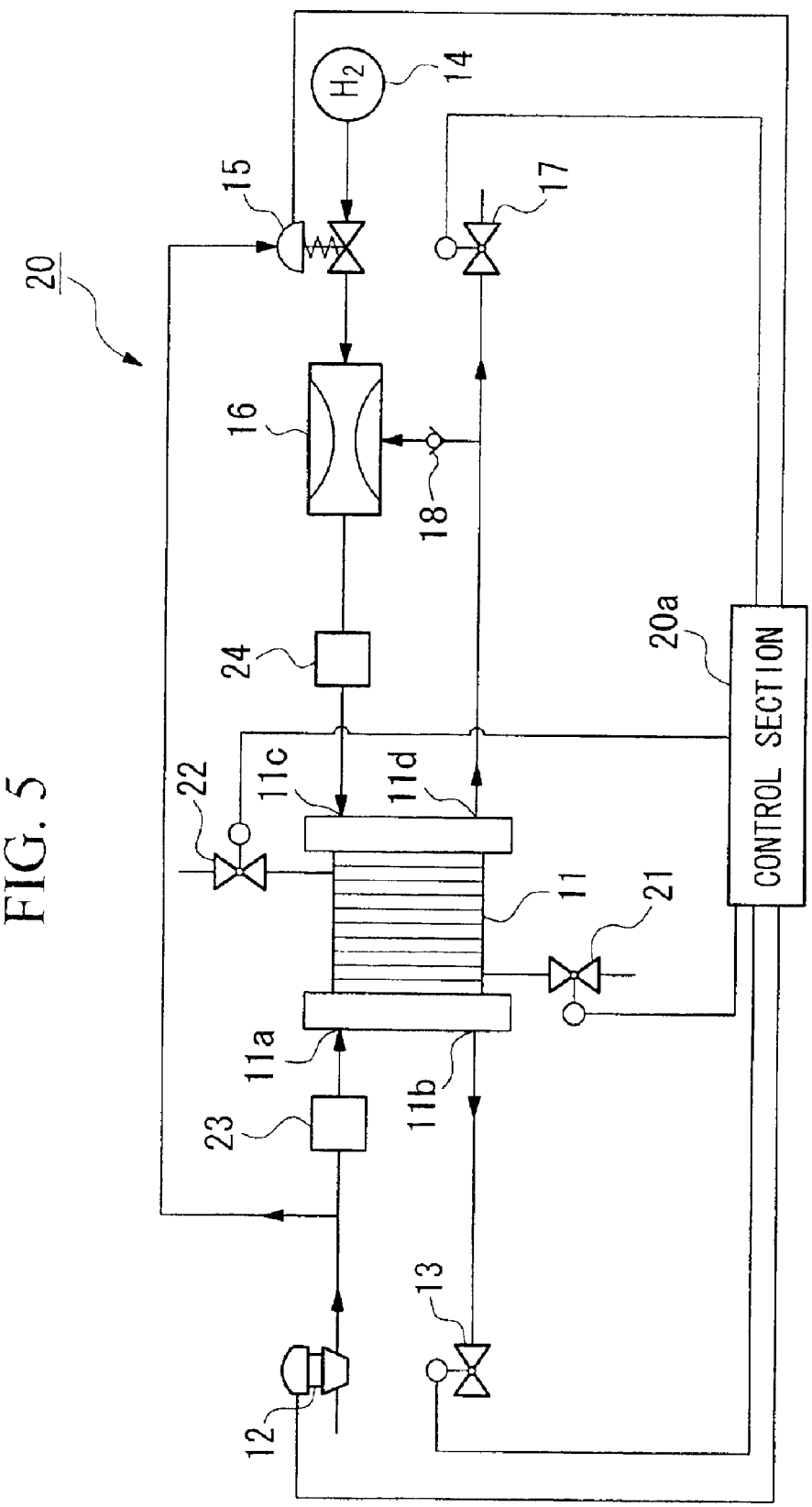
FIG. 5 is a diagram showing the structure of the remaining water draining system for a fuel cell as a variation of the embodiment.

In the above embodiment, the flow rate of each reaction gas is increased by opening and closing the back pressure valve 13 and the discharge valve 17. However, the method for increasing the flow rate is not limited to this method. FIG. 5 shows a remaining water draining system 20 for a fuel cell, as a variation of the present embodiment. As shown in FIG. 5, the system 20 has a cathode drain valve 21 and an anode drain valve 22 connected to the fuel cell 11. In addition to the back pressure valve 13 and the discharge valve 17, the cathode drain valve 21 and the anode drain valve 22 may also be opened and closed for increasing the flow rate of the reaction gas.

Below, the remaining water draining system 20 as a variation of the present embodiment will be explained. In the following explanation, parts identical to those of the remaining water draining system 10 are given identical reference numerals and explanations thereof are omitted or simplified.

The remaining water draining system 20 for a fuel cell comprises a control section 20a, a fuel cell 11, an air supply section 12, a back pressure valve 13, a fuel supply section 14, a fuel supply side pressure control section 15, an ejector 16, a discharge valve 17, a cathode drain valve 21, an anode drain valve 22, an air electrode side humidifying section 23, and a fuel electrode side humidifying section 24. The control section 20a controls the operation of each section which connected to the control section 20a.

The cathode drain valve 21 is provided at a suitable position of a passage through which air flows, preferably, in the vicinity of an outlet of the passage where water tends to remain, so as to discharge air and the remaining water outside the fuel cell 11.

The anode drain valve 22 is provided at a suitable position of a passage through which hydrogen flows, so as to discharge hydrogen and the remaining water outside the fuel cell 11.

The cathode drain valve 21 and the anode drain valve 22 are closed during the steady operation of the fuel cell 11.

The air electrode side humidifying section 23 is provided for mixing air, which functions as an oxidizing gas and is supplied from the oxidizing gas supply section 12, with water vapor so as to humidify the air and supply the humidified air to the fuel cell 11. The fuel electrode side humidifying section 24 is provided for mixing hydrogen, which functions as fuel and is supplied from the fuel supply section 14 via the ejector 16, with water vapor so as to humidify the hydrogen and supply the humidified hydrogen to the fuel cell 11. Accordingly, the required ion conductivity of the solid polymer electrolyte membrane is maintained.

Figure 6:
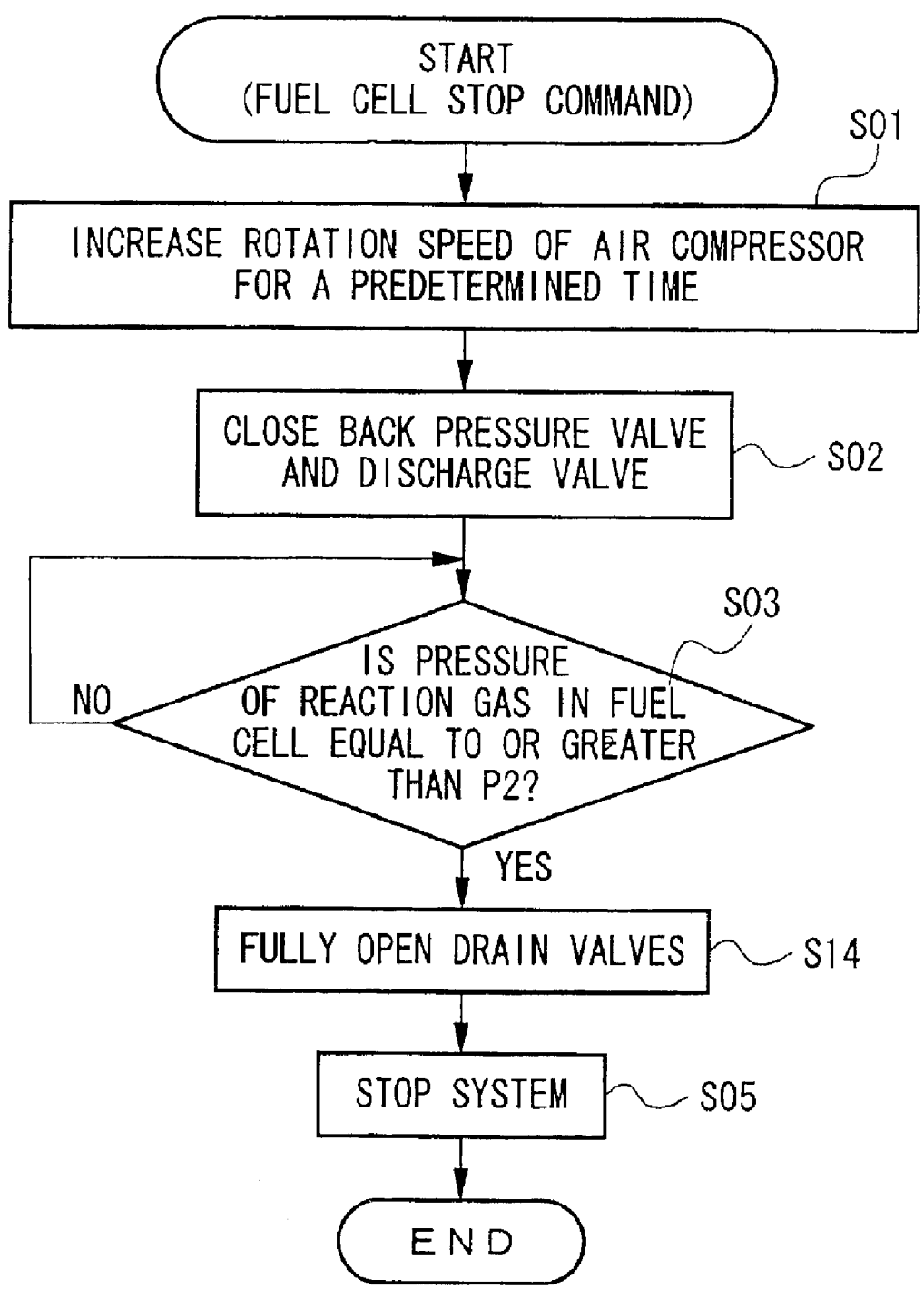
FIG. 6 is a flowchart showing the operation of the remaining water draining system in FIG. 5.

Below, the operation of the remaining water draining system 20 will be explained with reference to the drawings. FIG. 6 is a flowchart showing the operation of the remaining water draining system 20.

The distinctive feature of the operation of the remaining water draining system 20 in comparison with that of the remaining water draining system 10 is step S14 in FIG. 6, that is, the step executed when the result of the determination in step S03 is "YES".

In step S14, the cathode drain valve 21 and the anode drain valve 22 are fully opened. Accordingly, as shown in FIG. 3, the flow rate of each reaction gas discharged via the cathode and anode drain valves 21 and 22 suddenly increases to the second predetermined flow rate L2 (L2>L1)

at time t3 when these valves are fully opened, and the flow rate L2 is maintained for a suitable time. As shown in FIG. 4, after t3 when the cathode and anode drain valves 21 and 22 are fully opened, the pressure of the reaction gas which circulates inside the fuel cell 11 has a (suddenly-decreased) level P0 which is the atmospheric pressure P0.

That is, in this variation, the remaining water in the gas passages can be efficiently drained outside by using the drain valves 21 and 22 (provided for draining water in the fuel cell 11).

In the above-explained remaining water draining systems 10 and 20, electric power generated by the fuel cell 11 may be used for increasing the rotation speed of the air compressor which is included in the oxidizing gas supply section 12. In this case, no external power source is necessary, thereby simplifying the system structure. While no current load is connected, that is, while the power generation of the fuel cell is stopped, power supplied from a battery or the like, or power obtained from an external device may be used. In this case, water is not generated because the power generation of the fuel cell 11 is stopped. Therefore, it is possible to improve the drain capability of the remaining water in the gas passages.

Also in the above-explained remaining water draining systems 10 and 20, the draining operation due to the increase of the pressure of the gas, that is, the processes from step S02 to S04, is not repeatedly performed. However, the processes from step S02 to S04 may be repeated.

In the remaining water draining system 10, after the increase of the flow rate of the gas, the timing at which the decrease of the flow rate of the gas starts and the timing at which the increase of the pressure of the gas starts are equal, as shown in FIGS. 3 and 4 (i.e., at time t2). However, the timing condition is not limited to the above. For example, the pressure of the gas may be increased during the increase of the flow rate of the gas. Instead, after the increase of the flow rate of the gas, the pressure of the gas may be increased during the decrease of the flow rate of the gas or after the decrease of the flow rate of the gas.

In the above embodiment, the draining of the remaining water is performed by two steps, as explained above. However, the first step, that is, the quantitative draining by increasing the flow rate of the reaction gas may be omitted, and the second step itself, that is, the qualitative draining by increasing and then decreasing the gas pressure, is substantially effective for draining the remaining water in the gas passage of the fuel cell.

What is claimed is:

1. A method of draining remaining water in a gas passage of a fuel cell while the operation of the fuel cell is stopped, said method comprising the steps of:

supplying a reaction gas to the gas passage of the fuel cell that is operationally stopped;

increasing the pressure of the supplied reaction gas to a predetermined value and then decreasing the increased pressure of the reaction gas;

prohibiting a discharge of the reaction gas from the gas passage while continuously supplying the reaction gas to the gas passage so as to increase the pressure of the supplied reaction gas; and discharging the reaction gas from the gas passage so as to decrease the pressure of the supplied reaction gas.

2. A system for draining remaining water in a fuel cell, comprising:

a gas supply section for supplying a reaction gas through a gas passage of the fuel cell;

a gas flow-rate control section for increasing a flow rate of the reaction gas while the operation of the fuel cell is stopped, a gas pressure control section for increasing a pressure of the reaction gas and then decreasing the increased pressure after the flow rate of the reaction gas is increased by the gas flow-rate control section; and wherein the system further comprises a valve for discharging the reaction gas from the gas passage, and the gas pressure control section closes the valve and continues supplying the reaction gas by means of the gas supply section, and opens the valve when a pressure in the gas passage is at a predetermined value or higher.

* * * * *